United States Patent [19]
White, Jr. et al.

[11] Patent Number: 6,149,185
[45] Date of Patent: Nov. 21, 2000

[54] SUPPORT DEVICE FOR A VEHICLE OCCUPANT SAFETY APPARATUS

[75] Inventors: Michael J. White, Jr., Almont; Michelle M. Abraham, Macomb, both of Mich.

[73] Assignee: TRW Vehicle Safety Systems Inc., Lyndhurst, Ohio

[21] Appl. No.: 09/326,943

[22] Filed: Jun. 7, 1999

[51] Int. Cl.[7] ................................................. B60R 21/16
[52] U.S. Cl. ..................................... 280/728.2; 280/730.2
[58] Field of Search ............................... 280/728.2, 730.2

[56] References Cited

U.S. PATENT DOCUMENTS

| | | | |
|---|---|---|---|
| 5,755,457 | 5/1998 | Specht | 280/728.2 |
| 5,791,683 | 8/1998 | Shibata et al. | 280/730.2 |
| 5,899,486 | 5/1999 | Ibe | 280/728.2 |
| 5,921,575 | 7/1999 | Kretschmer et al. | 280/728.2 |
| 5,957,487 | 9/1999 | Stütz | 280/730.2 |
| 6,022,044 | 2/2000 | Cherry | 280/730.2 |

*Primary Examiner*—Kenneth R. Rice
*Attorney, Agent, or Firm*—Tarolli, Sundheim, Covell, Tummino & Szabo L.L.P

[57] ABSTRACT

A vehicle occupant safety apparatus (10) for helping to protect an occupant of a vehicle (12) having a side structure (16) comprises a cushioning device (14) having a deflated condition and an inflated condition in which the cushioning device (14) is inflated between an occupant of a vehicle (12) and the side structure (16) of the vehicle. The apparatus includes a fill tube (24) having a portion located in the cushioning device (14) that directs inflation fluid into the cushioning device (14) to inflate the cushioning device (14). A support device (40) has a portion that attaches to the fill tube (24) and supports the fill tube (24) and the cushioning device (14) in the vehicle (12). A fastener (170) fixedly connects the support device (40) and the fill tube (24) to the side structure (16) of the vehicle (12). The fastener (170) has a portion that cooperates with a tool for securing the fastener (170) to the vehicle (12). The support device (40) has a fastener receiving portion (44) for blocking movement of the tool transverse to the axis (178) and preventing engagement of the tool with cushioning device (14).

8 Claims, 4 Drawing Sheets

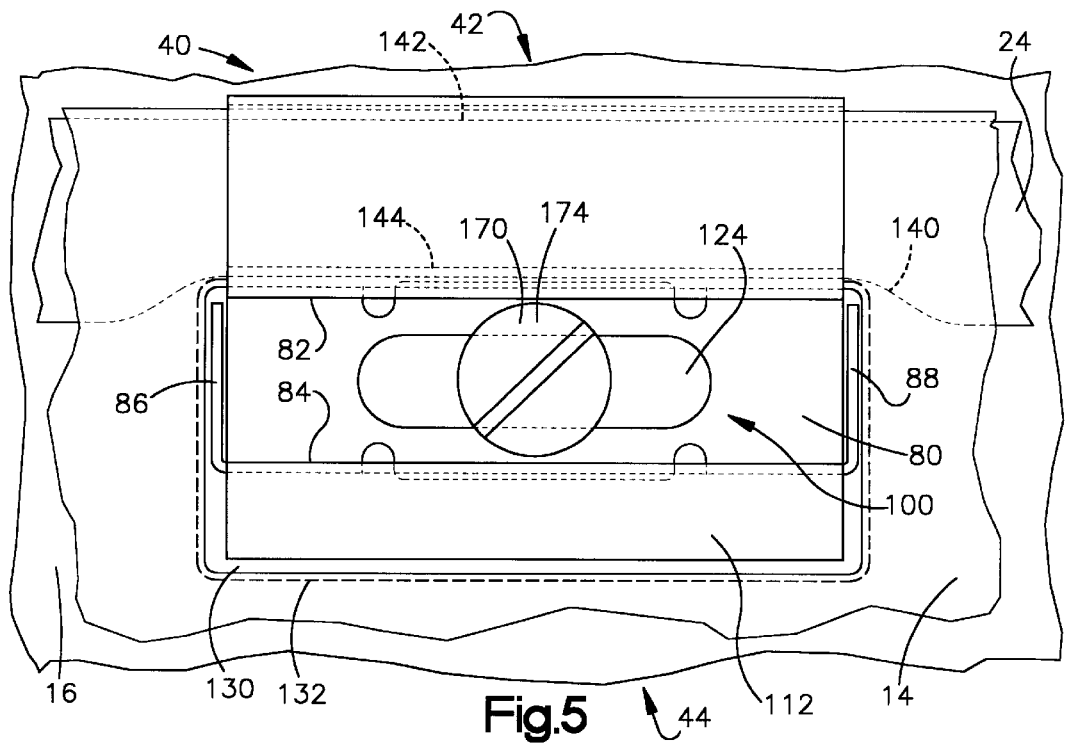
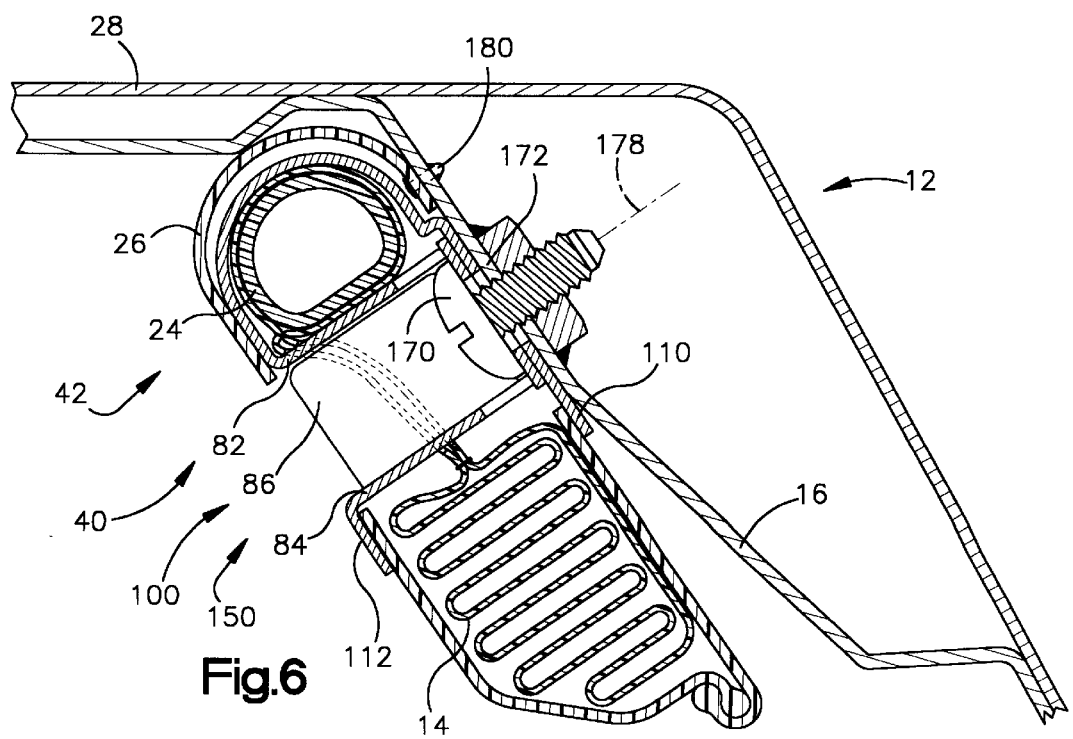

SUPPORT DEVICE FOR A VEHICLE OCCUPANT SAFETY APPARATUS

BACKGROUND OF THE INVENTION

1. Technical Field

The present invention relates to a vehicle occupant safety apparatus. In particular, the present invention relates to a support device for an inflatable cushioning device that helps to protect a vehicle occupant in the event of a side impact to a vehicle and/or a vehicle rollover.

2. Description of the Prior Art

It is known to inflate a cushioning device to help protect a vehicle occupant in the event of a vehicle collision. A cushioning device which is inflatable from the roof of the vehicle between a vehicle occupant and a side structure of the vehicle in the event of a side impact or rollover is also known. The cushioning device is inflated from a deflated condition by inflation fluid directed from an inflator to the cushioning device through a fill tube.

The known cushioning device is stored in a folded, deflated condition in a housing. A support device such as a clamp or bracket is used to connect the fill tube and the cushioning device to the vehicle. When installing a known cushioning device, fasteners used to connect the support device to the vehicle must be aligned with locations in the vehicle that receive the fasteners. Care must be exercised so as not to damage the cushioning device during installation.

SUMMARY OF THE INVENTION

The present invention relates to a vehicle occupant safety apparatus for helping to protect an occupant of a vehicle having a side structure. The apparatus includes a cushioning device that has a deflated condition and an inflated condition in which the cushioning device is inflated between an occupant of a vehicle and the side structure of the vehicle. The apparatus includes a fill tube with a portion located in the cushioning device to direct inflation fluid into the cushioning device to inflate the cushioning device. A support device has a portion that attaches to the fill tube and cushioning device and supports the fill tube and the cushioning device in the vehicle.

A fastener fixedly connects the support device to the side structure of the vehicle. The fastener has a portion that cooperates with a tool for securing the fastener to the vehicle. The support device has a portion for blocking movement of the tool transverse to the axis to minimize the possibility of engagement of the tool with the cushioning device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a fragmentary enlarged front elevational view of a portion of the vehicle occupant safety apparatus of FIG. 1;

FIG. 6 is a sectional view of the vehicle occupant safety apparatus taken along line 6—6 of FIG. 1;

DESCRIPTION OF PREFERRED EMBODIMENTS

Figure 1:
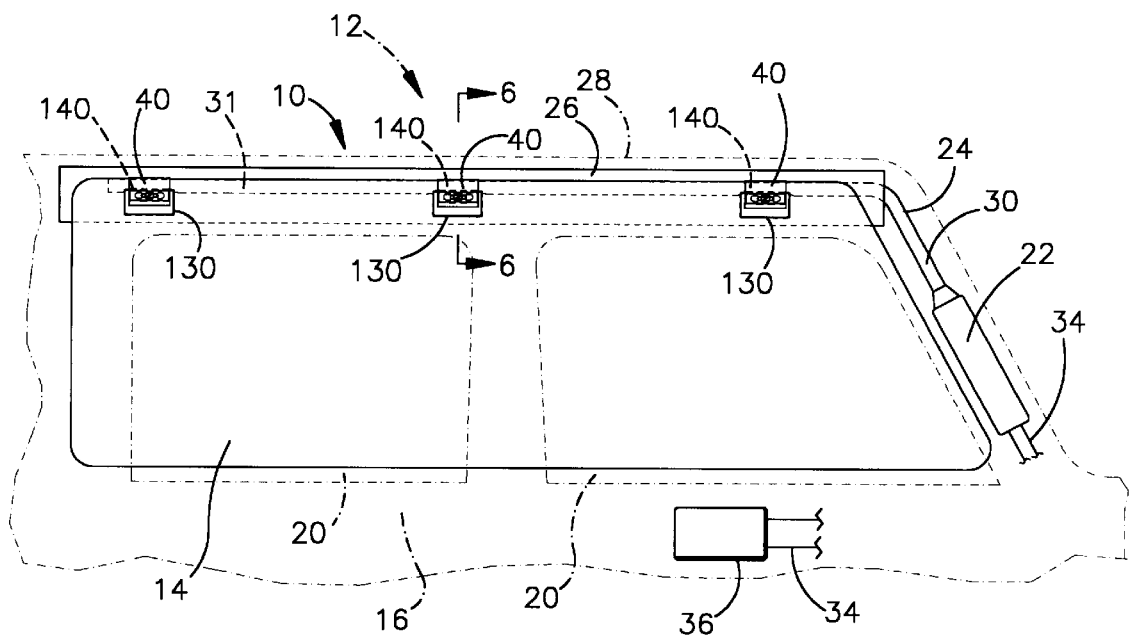
FIG. 1 is a schematic representation of a side elevation of a vehicle occupant safety apparatus in accordance with a first embodiment of the present invention.

As representative of the present invention, a vehicle occupant safety apparatus 10 for helping to protect an occupant of a vehicle 12 is shown in FIG. 1. The vehicle occupant safety apparatus 10 includes an inflatable cushioning device 14. The cushioning device 14 is mounted adjacent to the side structure 16 of the vehicle 12. The side structure 16 of the vehicle 12 includes side windows 20. The cushioning device 14 is inflated upon actuation of an inflator 22. The inflator 22 is connected in fluid communication with the cushioning device 14 through a fill tube 24. When inflated, the cushioning device 14 becomes located between the vehicle occupant and the side structure 16 of the vehicle 12 to help to protect an occupant of the vehicle 12 in the event of a side impact to the vehicle and/or a vehicle rollover.

A housing 26 stores the cushioning device 14 in a deflated condition and opens upon the inflation of the cushioning device 14. The fill tube 24, the deflated cushioning device 14, and housing 26 have an elongated configuration and extend along the roof 28 of the vehicle 12 and along the side structure 16 of the vehicle 12 above the side windows 20.

The fill tube 24 has a first end portion 30 for receiving fluid from the inflator 22. The fill tube 24 has a second end portion 31 which is disposed in the cushioning device 14. The second end portion 31 of the fill tube 24 has a plurality of openings (not shown) that provide fluid communication between the fill tube 24 and the cushioning device 14.

The inflator 22 preferably contains a stored quantity of pressurized inflation fluid (not shown) in the form of a gas to inflate the cushioning device. The inflator 22 alternatively could contain a combination of pressurized inflation fluid and ignitable material for heating the inflation fluid, or could be a pyrotechnic inflator which uses the combustion of gas-generating material to generate inflation fluid. Lead wires 34 extend from one end of the inflator 22.

The vehicle 12 includes a sensor mechanism 36 (shown schematically in FIG. 1) for sensing a side impact to the vehicle 12 and/or a rollover of the vehicle 12. For example, in the event of a side impact to the vehicle 12 of a magnitude greater than a predetermined threshold value, the sensor mechanism 36 causes an electrical signal to be sent over the lead wires 34 to the inflator 22. The electrical signal causes the inflator 22 to be actuated in a known manner. The inflator 22 discharges fluid under pressure into the fill tube 24. The fill tube 24 directs the fluid into the cushioning device 14. The cushioning device 14 inflates under the pressure of the inflation fluid into a position between the side structure 16 of the vehicle 12 and any occupants of the vehicle 12.

Figure 2:
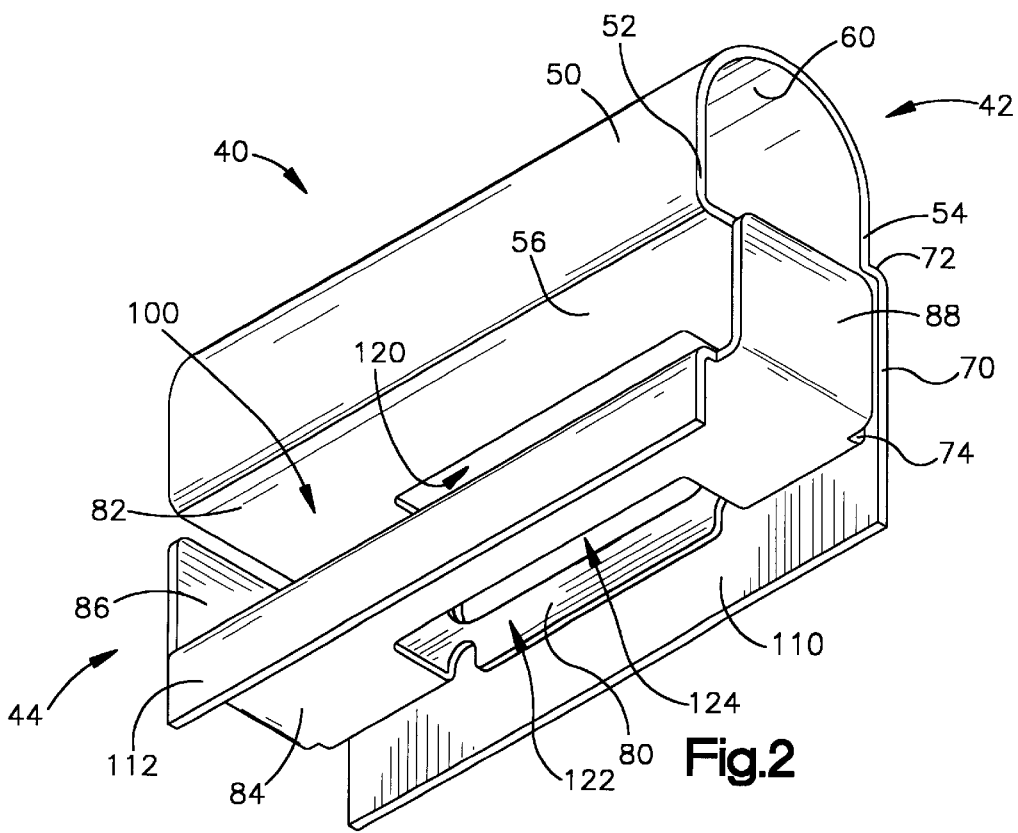
FIG. 2 is a perspective view of a support device which forms a portion of the vehicle occupant safety apparatus of FIG. 1.

A plurality of support devices 40 connect the cushioning device 14 and fill tube 24 to the side structure 16 of the vehicle 12. As illustrated in FIG. 2, each support device 40 consists of a clamp portion 42 and a fastener receiving portion 44. The support device 40 is constructed of a single piece of metal material that is cut in a predetermined pattern and folded or bent to form the clamp portion 42 and fastener receiving portion 44. However, those skilled in the art will recognize that alternative materials, such as plastic, and alternative designs, such as a multi-piece construction, may be equally suitable for the support device 40.

The clamp portion 42 includes an arcuate portion 50 having first and second radial ends 52 and 54. A flat portion 56 of the clamp portion 42 extends from the first radial end 52 of the arcuate portion 50 to adjacent the radial second end 54. The clamp portion 42 also includes an inner clamping surface 60.

Figure 4:
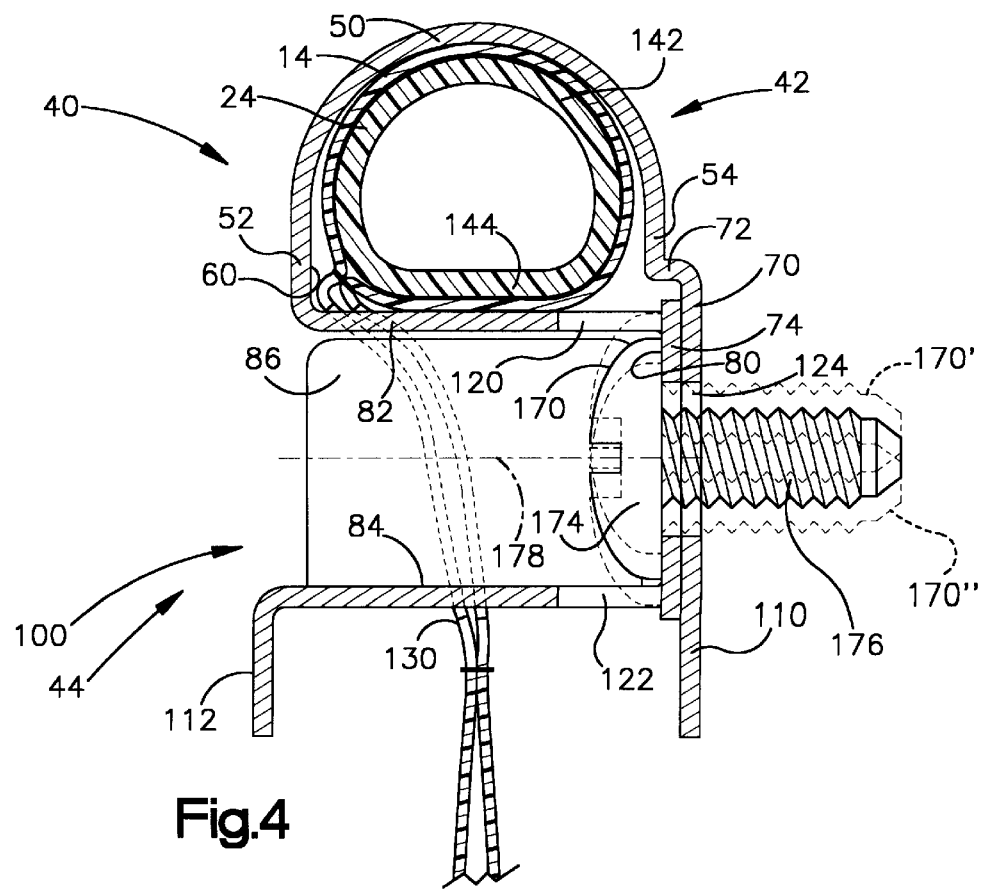
FIG. 4 is a sectional view of the vehicle occupant safety apparatus of FIG. 1 showing parts assembled together.

Referring now to FIGS. 2 and 4, a first clamp flange 70 extends from the second radial end 54 of the arcuate portion 50 in a direction perpendicular to the flat portion 56. The first clamp flange 70 is offset from the arcuate portion 50 by a shoulder portion 72. A second clamp flange 74 extends from an end of the flat portion 56 adjacent the second radial end 54 of the arcuate portion 50 in a direction perpendicular to the flat portion 56. The first and second clamp flanges 70 and 74 are positioned in an adjacent and overlying relationship.

The fastener receiving portion 44 includes a rectangular bottom wall 80 formed by the overlying first and second clamp flanges 70 and 74. First and second opposite side walls 82 and 84 and first and second opposing end walls 86 and 88 extend perpendicularly from the bottom wall 80 to form a fastener receiving chamber 100. The first side wall 82 is defined by the flat portion 56 of the clamping portion 50. The second side wall 84 extends perpendicularly from the second clamp flange 74 in a direction parallel to the first side wall 82. The first and second end walls 86 and 88 consist of folded end portions of the second side wall 84 that extend perpendicularly from the second side wall 84 to adjacent the first side wall 82.

The first clamp flange 70 extends beyond the second clamp flange 74 and forms a first housing support flange 110. A second housing support flange 112 extends perpendicularly from an edge of the second side wall 84 opposite the bottom wall 80 in a direction away from the fastener receiving chamber 100.

Elongated first and second openings 120 and 122 extend through the first and second side walls 82 and 84, respectively. The first opening 120 extends along the first side wall 82 adjacent the bottom wall 80. The second opening 122 extends along the second side wall 84 adjacent the bottom wall 80. The first opening 120 and second opening 122 are aligned with each other in an opposing fashion.

An elongated fastener opening 124 extends through the first and second clamp flanges 70 and 74. The fastener opening 124 is centered between the first and second side walls 82 and 84.

As illustrated in FIGS. 1 and 5, the cushioning device 14 includes clamp apertures 130 spaced along its length. Each clamp aperture 130 extends entirely through the cushioning device 14 and has a tightly stitched sew line 132 (FIG. 5) which completely encircles the aperture 130. The sew line 132 helps to block leakage of the inflation fluid from the cushioning device 14 when the cushioning device 14 is inflated.

The fill tube 24 (FIGS. 4 and 5) is generally cylindrical in shape and includes a series of clamp sections 140 spaced along its length. The cylindrical fill tube 24 is flattened on one side along the extent of each clamping section 140. Thus, the fill tube 24 has an arcuate portion 142 and a flat portion 144 along the length of each clamp section 140.

The spacing of the clamp apertures 130 on the cushioning device 14 and the spacing of the clamp sections 140 on the fill tube 24 is such that the clamp apertures 130 are positioned adjacent the clamp sections 140 when the fill tube 24 is fully inserted into the cushioning device 14.

Figure 3:
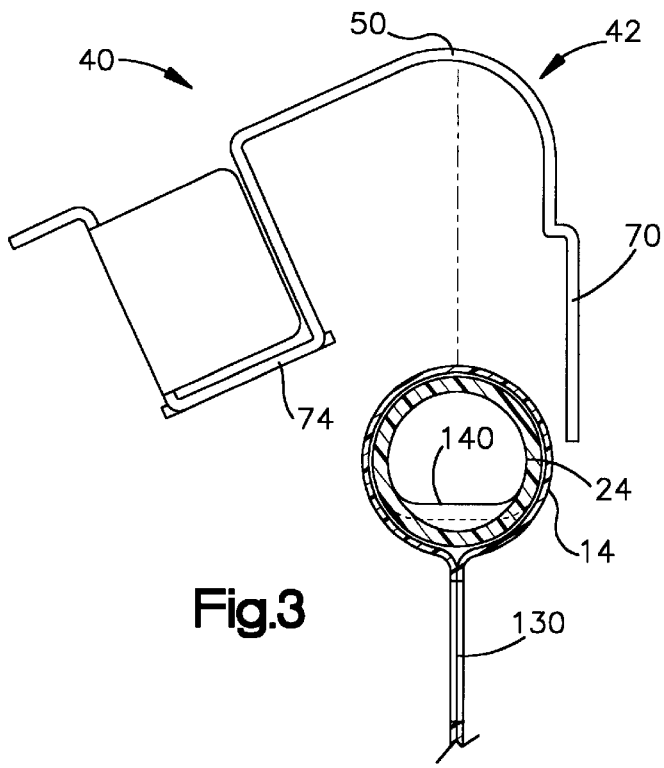
FIG. 3 is an end elevational view of the vehicle occupant safety apparatus of FIG. 1 depicting the assembly of parts of the apparatus.

Assembly of the fill tube 24, the cushioning device 14, the housing 26 and each support device 40 is required prior to installation in the vehicle 12. Assembly with one support device 40 is described below. The fill tube 24 is inserted into the cushioning device 14. As illustrated in FIG. 3, the first and second clamp flanges 70 and 74 of the support device 40 are spaced apart, and thus the clamp portion 42 is open. The clamp portion 42 of the support device 40 receives the fill tube 24 and the cushioning device 14, and the clamp section 140 of the fill tube is positioned within the clamp portion 42. Once the fill tube 24 and cushioning device are inserted into the clamp portion 42, as indicated by the dot-dash line in FIG. 3, the first and second clamp flanges 70 and 74 are moved together, closing the clamp portion 42. The arcuate portion 50 (FIG. 4) of the clamp portion 42 is positioned adjacent the arcuate portion 142 of the clamp section 140. The flat portion 56 of the clamp portion 42 is positioned adjacent the flat portion 144 of the clamp section 140.

When the first and second clamp flanges 70 and 74 are moved together, they become positioned adjacent one another. The first and second side walls 82, 84, and the end walls 86, 88 extend through the aperture 130 in the cushioning device 14. Thus, the fastener receiving portion 44 (FIG. 5) of the support device 40 is encircled by the cushioning device 14. The fastener receiving chamber 100 is unobstructed by the cushioning device 14.

The clamp portion 42 of the support device 40 encircles the fill tube 24 along the clamping section 140 of the fill tube 24. The portion of the cushioning device 14 (FIG. 4) surrounding the fill tube 24 is disposed between the inner clamping surface 60 of the clamping portion 42 and the fill tube 24. The inner clamping surface 60 of the clamp portion 42 loosely engages the fill tube 24 and cushioning device.

Referring now to FIG. 6, the housing 26 is positioned around the cushioning device 14, fill tube 24, and support device 40. The first and second housing support flanges 110 and 112 of each support device 40 engage the housing 26 and help to maintain its position relative to the support device 40. The housing 26 is cut away at locations 150 along its length. The spacing of the cut away locations 150 of the housing 26 is such that the fastener receiving chambers 100 of the support devices 40 are exposed at spaced locations along the length of the housing.

As shown in FIG. 1, three support devices 40 are used to support the fill tube 24, cushioning device 14 and housing 26 on the vehicle 12. Thus, in the illustrated embodiment, the vehicle occupant safety apparatus 10 includes three clamp apertures, three clamp portions 140, and three cut away locations 150.

The assembled fill tube 24, cushioning device 14, support devices 40, and housing 26 are located in a desired position relative to the side structure 16 of the vehicle 12. Once in the desired position, each support device 40 is fixedly connected to the side structure 16 of the vehicle 12 by a threaded fastener 170, such as a screw, as shown in FIG. 6. The threaded fastener 170 is inserted into the fastener receiving chamber 100 and through the fastener opening 124 which extends through the bottom wall 80. The fastener opening 124 of the support device 40 is aligned with a location 172, such as an opening, in the side structure 16 of the vehicle 12 to receive the threaded fastener 170. The threaded fastener 170 includes a fastener head 174 and a threaded shank portion 176. A tool (not shown) cooperates with the fastener head 174 to rotate the threaded fastener 170 about an axis 178. As the threaded fastener 170 is rotated about the axis 178, the threaded shank portion 176 is screwed into the location 172 attaching the support device 40, and thus attaching the assemblage, to the side structure 16 of the vehicle 12.

One may encounter difficulty in maintaining the desired position of the assemblage while connecting it to the vehicle 12 using the threaded fasteners 170. The vehicle occupant safety apparatus 10 may include a pre-hanging device such as a clip 180 that connects the housing 26 to the side structure 16 of the vehicle 12. The clip 180 would allow an installer to initially connect the assemblage relative to the side structure 16 of the vehicle 12 while freeing both hands to adjust and/or maintain the position of the assemblage while installing the threaded fasteners 170.

As the threaded fastener 170 is tightened, the first and second clamp flanges 70 and 74 of the fastener receiving portion 44 are drawn together and compressed between the fastener head 174 and the side structure 16 of the vehicle 12. As the first and second clamp flanges 70 and 74 are drawn together, a clamping force is applied to the cushioning device 14 and the fill tube 24 by the inner clamping surface 60 of the clamp portion 42. The fill tube 24 and cushioning device 14 are thus secured within the support device 40. Also, as the threaded fastener 170 is tightened, the assemblage is fixedly connected to the side structure 16 of the vehicle 12.

The construction of the support device 40 is such that the first and second side walls 82 and 84 are spaced apart a distance slightly greater than the width of the fastener head 174. This allows the fastener head 174 to enter the fastener receiving chamber 100. As a feature of the present invention, the configuration of the fastener opening 124 and the first and second openings 120 and 122 allows the threaded fastener 170 to be moved relative to the support device 40 while inserted in the fastener receiving chamber 100. The elongated configuration of the fastener opening 124 allows the position of the fastener 170 to be adjusted along the length of the fastener opening 124, as measured in a direction parallel to the first and second side walls 82 and 84. The width of the fastener opening 124, as measured transverse to its length, is larger than the diameter of the shank portion 176 and thus allows the position of the fastener 170 to be adjusted in a direction transverse to the length of the fastener opening 124.

The heights of the first and second openings 120 and 122 are greater than the height of the fastener head 174 as measured along the axis 178 of the fastener 170. When the fastener 170 is inserted into the fastener receiving chamber 100 as illustrated in FIG. 4, the fastener 170 can be adjusted in a direction transverse to the length of the fastener opening 124. As the position of the fastener 170 is adjusted towards either the first side wall 82 or the second side wall 84, a portion of the fastener head 174 extends through the first opening 120 or second opening 122, respectively. Adjusted positions of the fastener 170 towards the first and second side walls 82 and 84 are depicted in FIG. 4 by dotted lines 170' and 170".

The adjustment of the position of the fastener 170 relative to the support device 40 allows the assemblage to be adjusted moved to the side structure 16 of the vehicle 12 during installation. For example, the fasteners 170 may be partially installed in the locations 172 such that the support devices 40 are loosely connected to the side structure 16 of the vehicle 12, and then the position of the assemblage can be adjusted relative to the side structure 16 of the vehicle 12. When the desired position is achieved, the fasteners 170 can be fully tightened.

As another feature of the present invention, the fastener receiving chamber 100 helps prevent the tool from piercing or otherwise damaging the cushioning device 14 while installing the fasteners 170. The fastener receiving chamber 100 defines a path through which the tool moves into contact with the threaded fastener 170. The chamber 100 surrounds the tool as the tool tightens the fastener 170, blocking the tool from moving transverse to the axis 178 and isolating the tool from accidental contact with the cushioning device 14.

Figure 7:
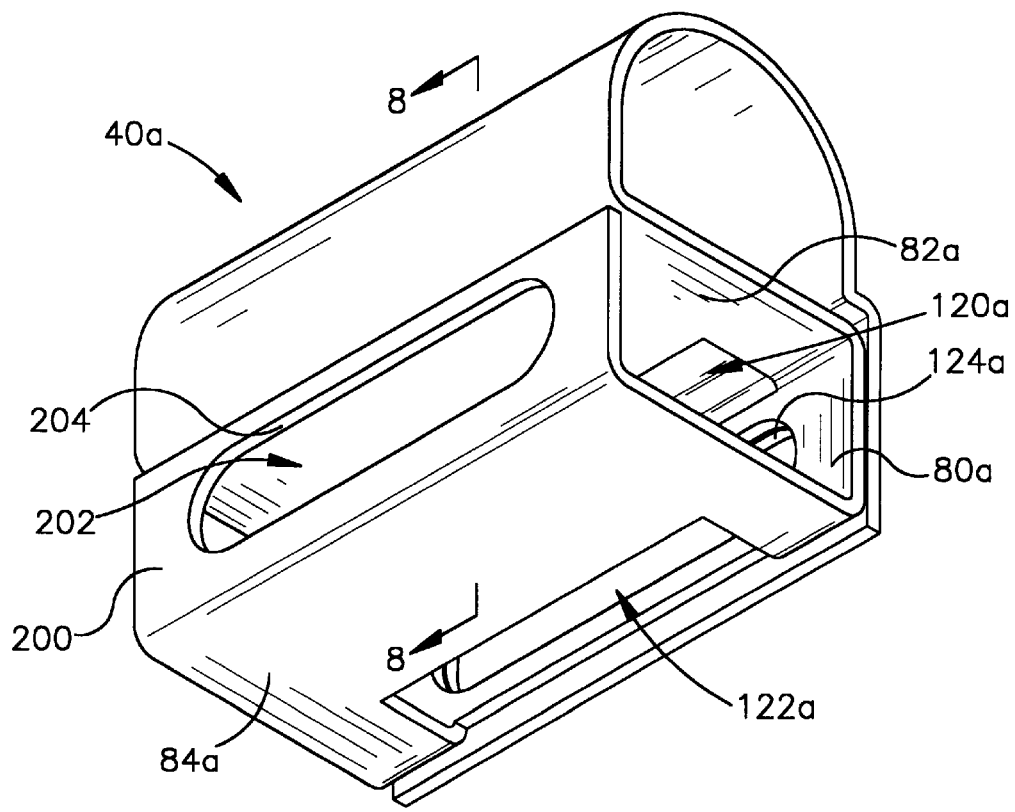
FIG. 7 is a perspective view of a support device which forms a portion of the vehicle occupant safety apparatus in accordance with a second embodiment of the invention.
Figure 8:
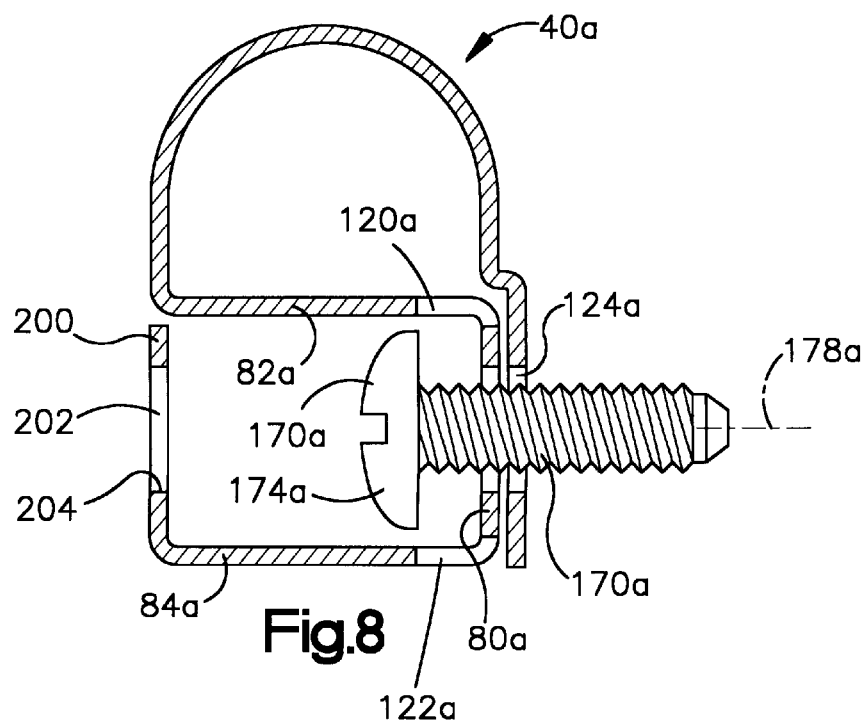
FIG. 8 is a sectional view taken along line 8—8 of FIG. 7.

A second embodiment of the present invention is illustrated in FIGS. 7 and 8. Since the second embodiment of the invention is similar to the first embodiment of the invention illustrated in FIGS. 1–6, numerals similar to those of FIGS. 1–6 will be utilized in FIGS. 7 and 8 to identify similar components, the suffix letter "a" being associated with the numerals of FIGS. 7 and 8 to avoid confusion.

Referring now to FIG. 7, a support device 40a connects the vehicle occupant safety apparatus 10 (FIG. 1) to the side structure 16 of the vehicle 12. The construction of the support device 40a (FIG. 7), in particular the fastener receiving portion 44a, differs from the construction of the support device 40 (FIG. 2).

The first and second end walls 86 and 88 of the first embodiment (FIGS. 1–6), as well as the first and second housing support flanges 110 and 112, are omitted in the second embodiment as illustrated in FIGS. 7 and 8.

In the second embodiment, a third side wall 200 extends from the second side wall 84a towards the first side wall 82a. The third side wall 200 is spaced apart from the bottom wall 80a in an overlying relationship and includes a third opening 202 aligned with the fastener opening 124a. The tool for rotating the fastener 170a moves into contact with the fastener 170a (FIG. 8) through the third opening 202. The third opening 202 is defined by edges 204 of the third side wall 200 that block movement of the tool in a direction transverse to the axis 178a, thus isolating the tool from accidental contact with the cushioning device 14 outside the third opening 202.

The width of the third opening 202, measured transverse to its length, is less than the width of the fastener head 174a. As a feature of the second embodiment of the invention, the third side wall 200 helps maintain the threaded fastener 170a positioned in the fastener receiving portion 44a of the support device 40a and helps prevent it from being displaced from within the fastener receiving portion 44a during installation.

Notwithstanding the differences in the construction of the fastener receiving portion 44a (FIGS. 7 and 8), the support device 40a connects the vehicle occupant safety apparatus 10 (FIG. 1) to the side structure 16 of the vehicle 12 using the fasteners 170a in a manner identical to that of the support device 40 (FIGS. 1–6). The fastener opening 124a (FIGS. 7 and 8) and first and second openings 120a and 122a allow the position of the assemblage to be adjusted relative to the side structure 16 of the vehicle 12 during installation in a manner identical to that of the support device 40 (FIGS. 1–6).

From the above description of the invention, those skilled in the art will perceive improvements, changes and modifications in the invention. Such improvements, changes and modifications within the skill of the art are intended to be covered by the appended claims.

Having described the invention, the following is claimed:

1. A vehicle occupant safety apparatus for helping to protect an occupant of a vehicle having a side structure, said apparatus comprising:

a cushioning device having a deflated condition and having an inflated condition in which said cushioning device is inflated between an occupant of a vehicle and the side structure of the vehicle;

a fill tube having a portion located in said cushioning device, said fill tube directing inflation fluid into said cushioning device to inflate said cushioning device;

a support device for supporting said fill tube and said cushioning device in the vehicle, said support device having a portion attaching to said fill tube and said cushioning device; and a fastener that fixedly connects said support device to the side structure of the vehicle, said fastener having a portion that cooperates with a tool for securing said fastener to the vehicle;

said support device having a fastener receiving portion for blocking movement of the tool transverse to said axis to minimize the possibility of engagement of the tool with said cushioning device.

2. A vehicle occupant safety apparatus as defined in claim 1 wherein said support device has a clamp portion for encircling and clamping said fill tube, said fastener receiving portion fixed to and extending from said clamp portion and defining a path through which said tool moves into contact with said fastener.

3. A vehicle occupant safety apparatus as defined in claim 2 wherein said clamp portion comprises:

an arcuate portion;

a flat portion extending from one radial end of said arcuate portion towards another radial end of said arcuate portion; and a pair of flanges with aligned fastener openings through which said fastener extends.

4. A vehicle occupant safety apparatus as defined in claim 3 wherein said flat portion of said clamp portion defines a first side wall of said fastener receiving portion, said fastener receiving portion including a second side wall extending from one of said flanges opposite said first side wall, said path located between said first and second side walls.

5. A vehicle occupant safety apparatus as defined in claim 4 wherein said fastener receiving portion further includes a pair of end walls which respectively lie on opposite sides of said path, said pair of end walls extending from said second side wall toward said first side wall, said pair of end walls and said first and second side walls defining a chamber for receiving said fastener, and blocking movement of the tool transverse to said axis.

6. A vehicle occupant safety apparatus as defined in claim 5 wherein said fastener has a shank portion and a fastener head which cooperates with the tool, said fastener opening having dimensions such that said fastener is movable transverse to said axis relative to said first or second side wall within said fastener opening, said first and second side walls having respective first and second openings for receiving a part of said fastener head when said fastener is moved transverse to said axis relative to said first or second side wall, respectively.

7. A vehicle occupant safety apparatus as defined in claim 4 further including a third side wall extending from said second side wall toward said first side wall, said third side wall positioned in an overlying relationship with said aligned openings and including a third opening through which said tool moves into contact with said fastener, said third opening being defined by edges of said third side wall which block movement of the tool transverse to said axis.

8. A vehicle occupant safety apparatus as defined in claim 7 wherein said third side wall is spaced away from said one of said flanges a distance less than the length of said fastener.

* * * * *